(No Model.)
J. J. PALMER.
PIPE TONGS.
No. 334,276. Patented Jan. 12, 1886.
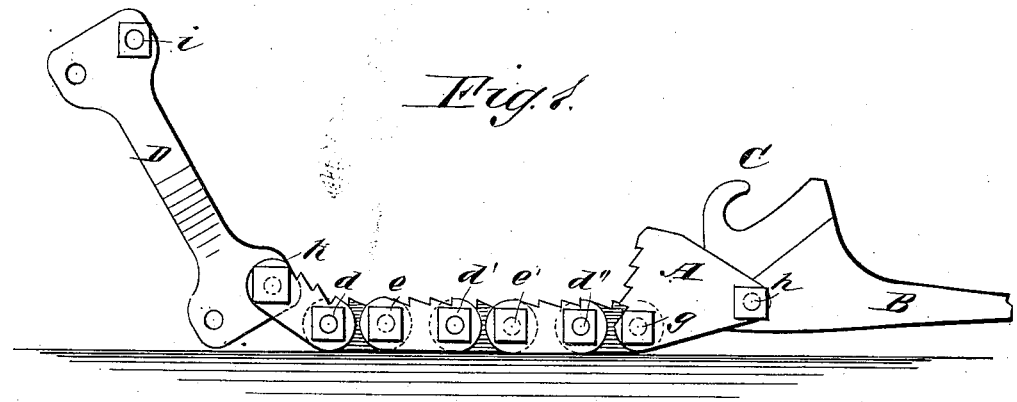
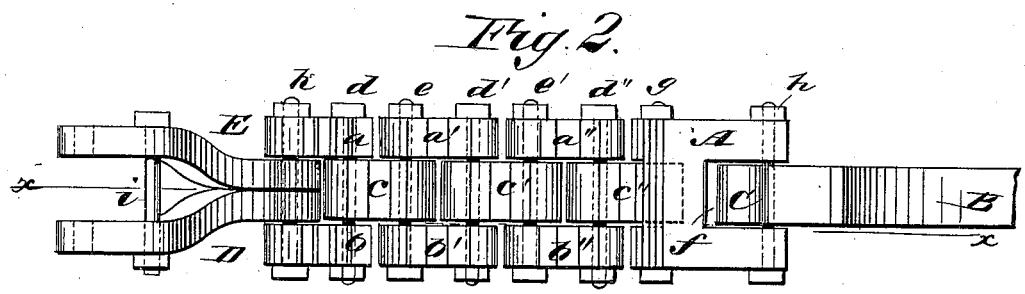
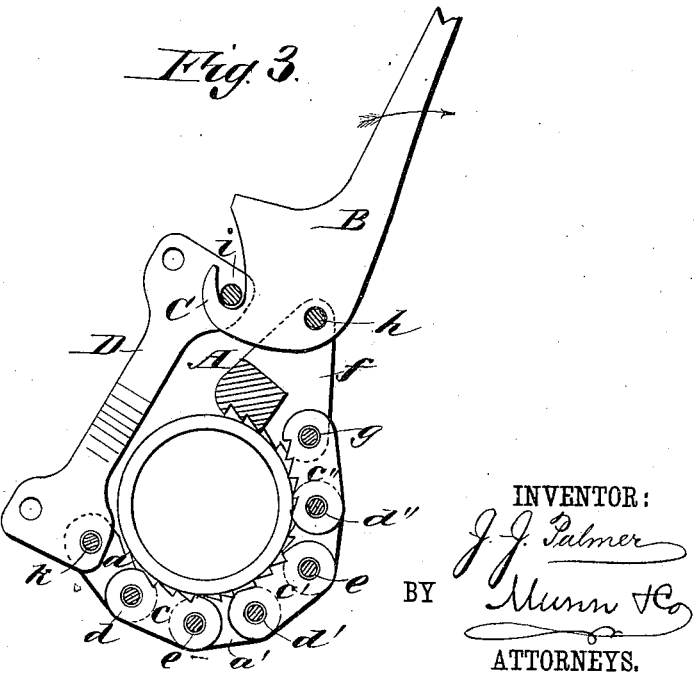
WITNESSES:
F. McArdle
C. Sedgwick
INVENTOR:
J. J. Palmer
BY Munn & Co
ATTORNEYS.

UNITED STATES PATENT OFFICE.

JAMES J. PALMER, OF FALL BROOK, PENNSYLVANIA.

PIPE-TONGS.

SPECIFICATION forming part of Letters Patent No. 334,276, dated January 12, 1886.

Application filed July 17, 1885. Serial No. 171,918. (No model.)

*To all whom it may concern:*

Be it known that I, JAMES J. PALMER, of Fall Brook, in the county of Tioga and State of Pennsylvania, have invented a new and Improved Pipe-Tongs, of which the following is a full, clear, and exact description.

My invention relates to the construction of pipe-tongs; and it consists, essentially, of tongs in which the binding contact-surface is composed of a number of sections, and of certain details of construction and combinations of parts, as will be fully described, and specifically pointed out in the claim.

Reference is to be had to the accompanying drawings, forming part of this specification, in which similar letters of reference indicate corresponding parts in all the figures.

Figure 1 is a side view of my improved form of pipe-tongs, showing the tongs in an extended position. Fig. 2 is a plan of the same; and Fig. 3 is a view of the tongs as applied to a pipe, the device being shown in section taken on line $x\,x$, Fig. 2.

The main clasping-body of the tongs is made of a series of links, as $a$, $b$, and $c$, and $a'$, $b'$, and $c'$, &c., each link being formed with two bolt-holes, one at either end. The forward ends of the links $a$ and $b$ are connected to the rear end of the link $c$ by a bolt, $d$, the link $c$ being placed between the links $a$ and $b$, as is clearly shown in Fig. 2.

The links, united as above described, constitute one section of the tongs, and as many of these sections as is necessary to operate upon the pipe are united by bolts, as $e$, which pass through the rear holes in the outer links, $a'\,b'$, and also through the forward hole of the central link, $c$, it being understood that the links $a'\,b'$ are connected to the link $c'$ by a bolt, $d'$.

The leading central link of the series of clamping-sections, which in the drawings is shown at $c''$, projects into a slot, $f$, formed in a block, A, the link being held therein by a bolt, $g$. The lever-arm or handle of the tongs (shown at B) is also pivotally mounted in the slot $f$ by the bolt $h$, and the broadened base of this handle is formed with a hook, C, arranged to engage with a pin or bolt, $i$, that passes through apertures formed in the upper ends of two bent arms, D and E, which spread apart as they rise from the tongs, to which they are connected by a bolt, $k$, which passes through the holes formed near the rear end of the links $a\,b$, and also through apertures formed in the two arms named, as best shown in Fig. 2.

The inner bearing-faces of the links employed to make up the flexible clamping-strip of my improved form of tongs are serrated, as is also the bearing-face of the block A.

In operation the clamping-links are passed around the pipe and the hook C brought into engagement with the pin $i$, when, by carrying the lever-arm B over in the direction of the arrow, shown in Fig. 3, the serrated faces of the several links and of the block A will be brought to bear hard against the outer surface of the pipe, which may be turned by continuing the power applied to the lever B.

By removing or adding links or sections, the tongs may be adjusted to fit almost any sized pipe.

The tongs may be made of any suitable metal, and I prefer to make the bearing-faces of the links slightly concave, so that a better grip will be obtained upon the pipe.

Having thus fully described my invention, I claim as new and desire to secure by Letters Patent—

The pipe-tongs comprising the series of serrated links $a\,b\,c$, united by bolts, the serrated block A, the connected arms D E, having inner curved edges, and the lever-arm B, pivoted to the block A at its lower rear edge, and provided with a hook, C, at its lower forward end, substantially as and for the purpose set forth.

JAMES J. PALMER.

Witnesses:
J. S. GRIFFIN,
S. B. GRIFFIN.